United States Patent [19]

Anderson, Jr.

[11] Patent Number: 4,580,703

[45] Date of Patent: Apr. 8, 1986

[54] FLUID METERING APPARATUS

[76] Inventor: David L. Anderson, Jr., 24655 Vereda Corta, Salinas, Calif. 93908

[21] Appl. No.: 592,630

[22] Filed: Mar. 23, 1984

[51] Int. Cl.$^4$ ............................................. B65D 88/54
[52] U.S. Cl. ...................................... 222/335; 222/71; 73/864.35
[58] Field of Search ............... 222/160, 162, 154, 158, 222/159, 344, 355, 333, 334, 335, 394, 397, 373, 71; 141/18; 73/864.34, 864.35, 864.31; 137/204, 240

[56] References Cited

FOREIGN PATENT DOCUMENTS 2098583 11/1982 United Kingdom .................. 222/71

Primary Examiner—Joseph J. Rolla
Assistant Examiner—Kenneth Noland
Attorney, Agent, or Firm—Limbach, Limbach & Sutton

[57] ABSTRACT

A precision fluid measuring apparatus is provided which is simple to operate and manufacture, but which permits precise measurement of fluid quantities in a closed system. A flow passageway is defined by a conduit having three sets of apertures wherein the first set of apertures is located at one end of the conduit and the other two sets of apertures are located at the other end of the conduit. A blocking member is positioned in the flow passageway of the conduit and between the second and third sets of apertures. An envelope is provided which surrounds the three sets of apertures and which is slidable along the conduit between an upstream and a downstream position. Collars are provided which seal the first set of apertures and the second set of apertures when the envelope is in the downstream position. The collars provide a hermetic seal between the envelope and the conduit. Further, grooves are provided on the conduit to defeat the hermetic seal in the envelope in the vicinity of the first set of apertures when the envelope is in the downstream position.

14 Claims, 12 Drawing Figures

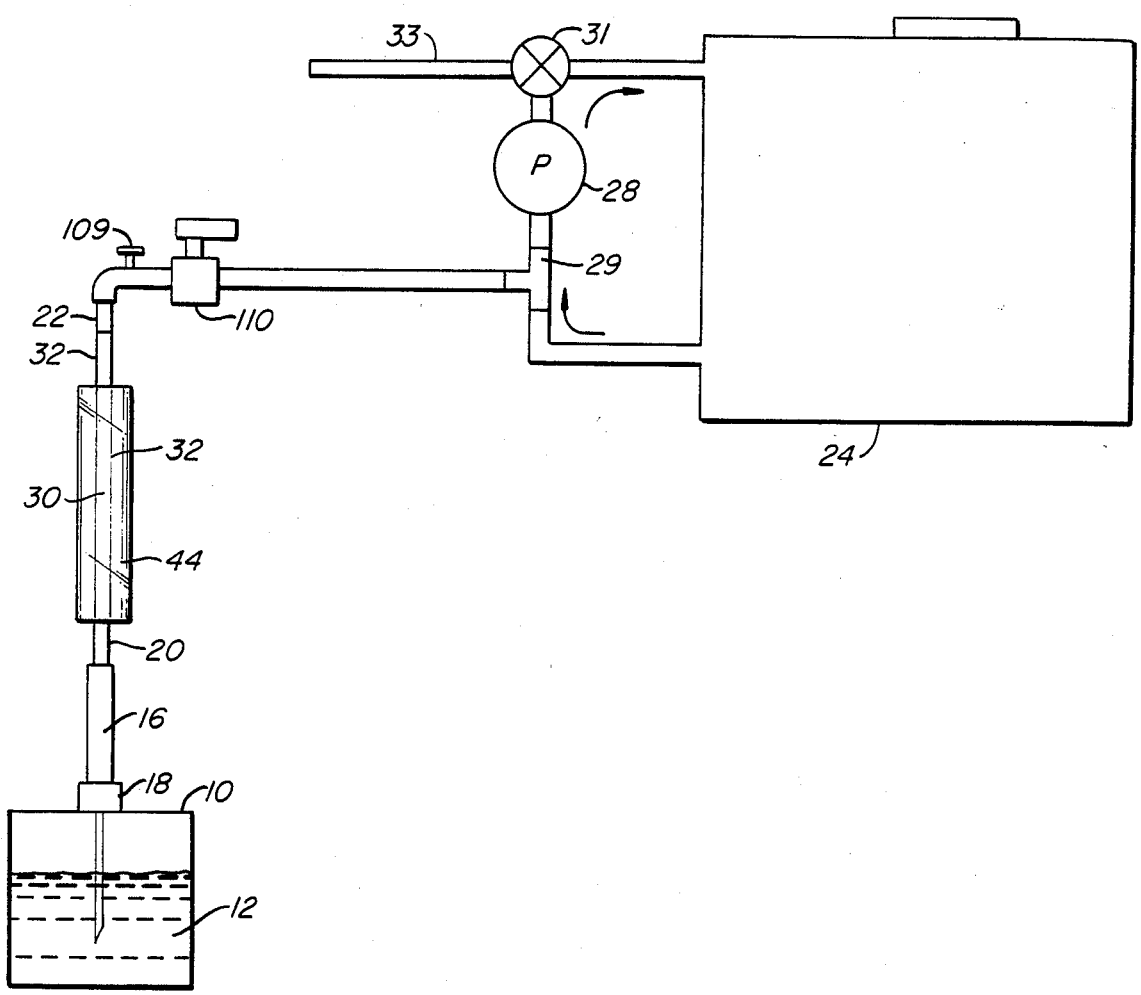
FIG._1.

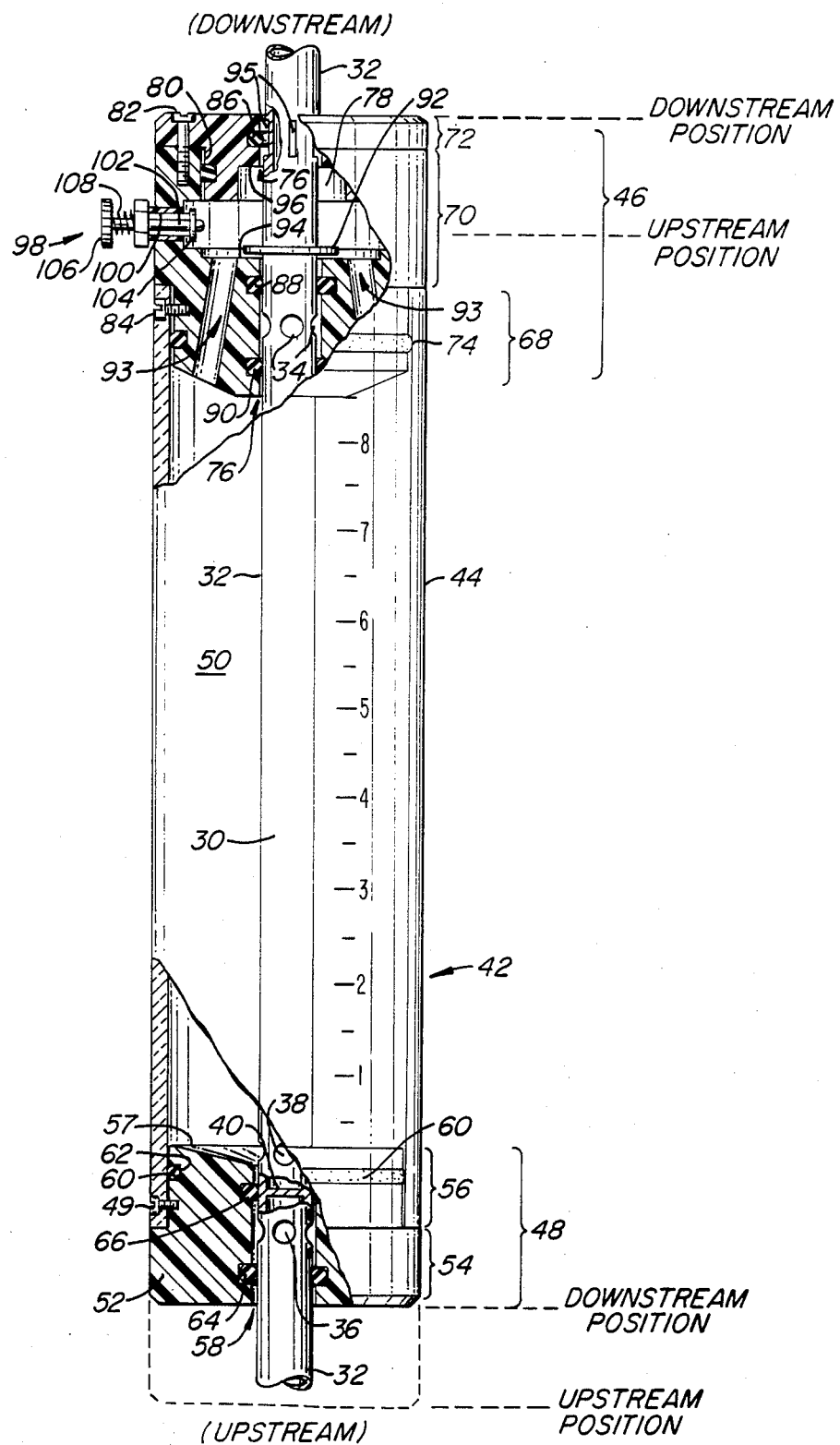
FIG._2.

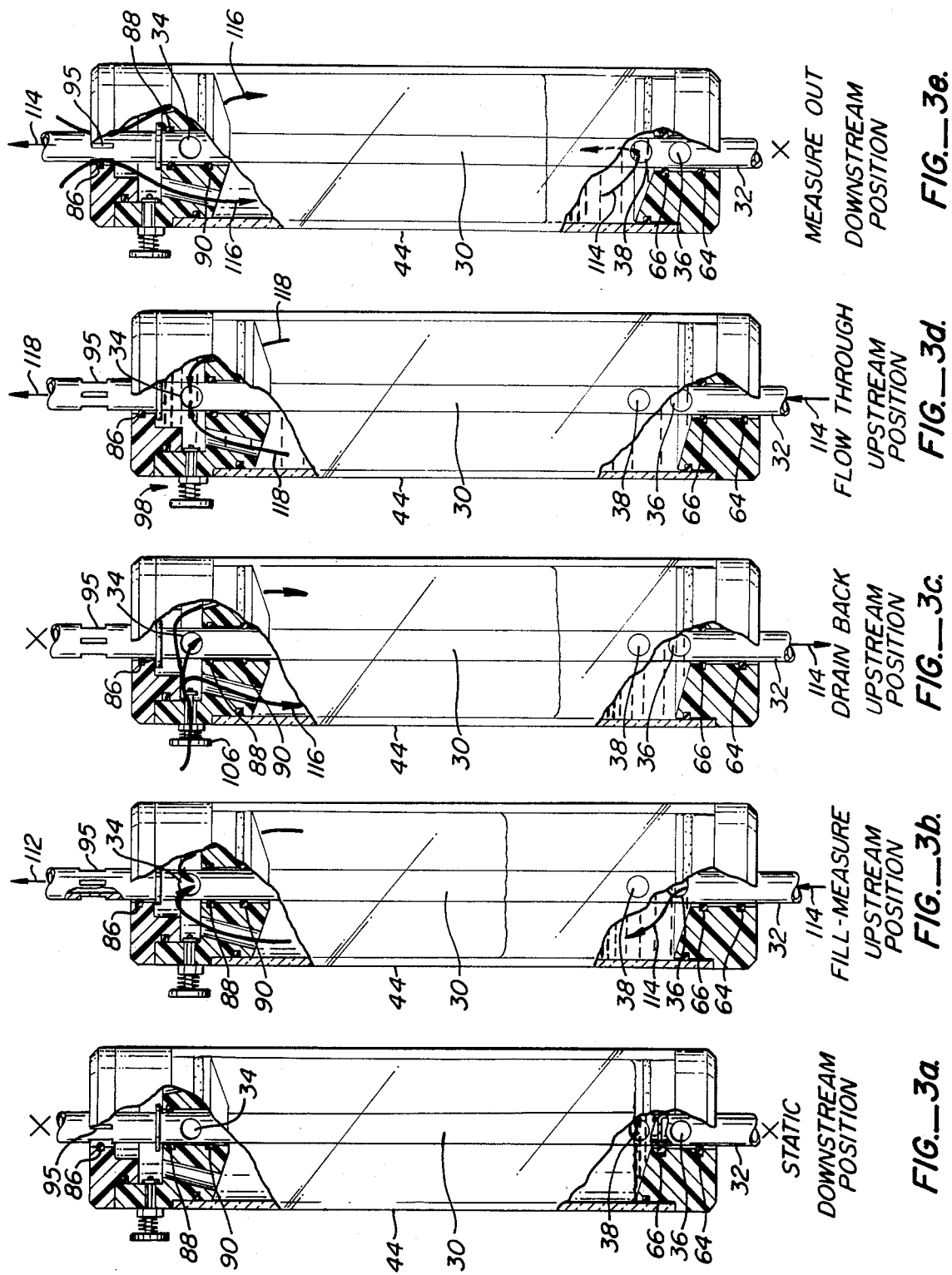

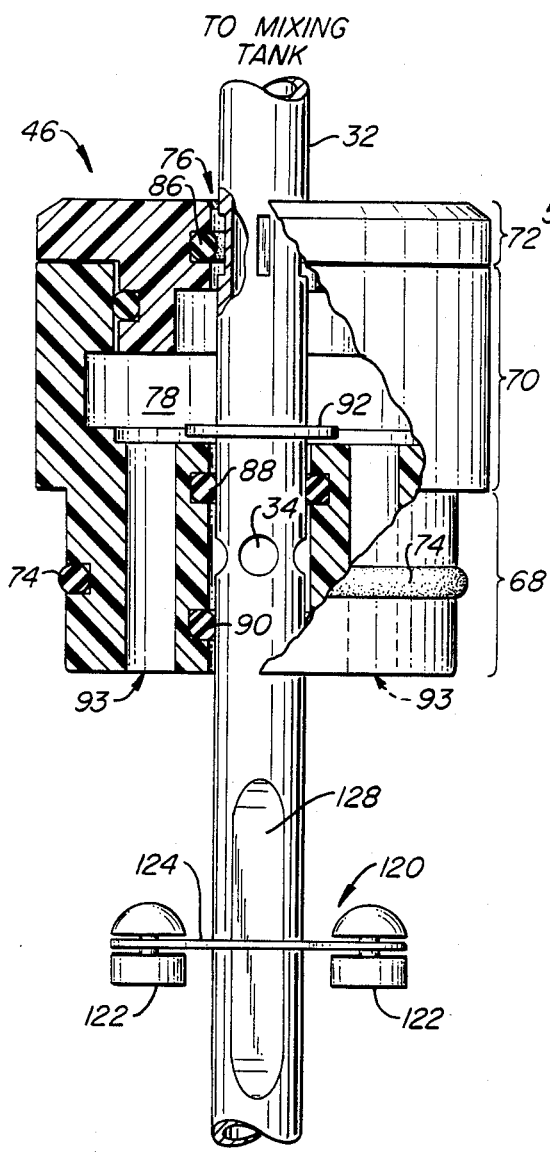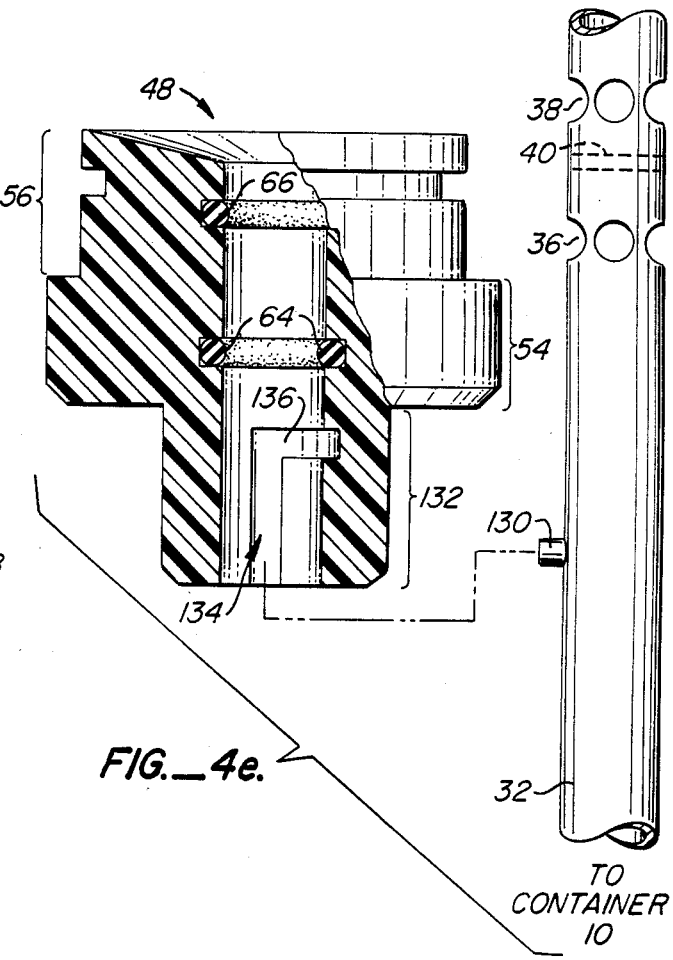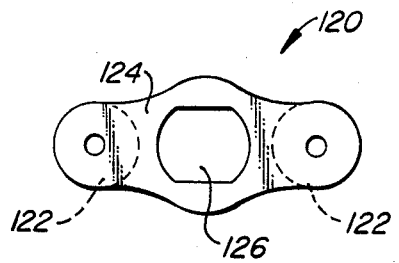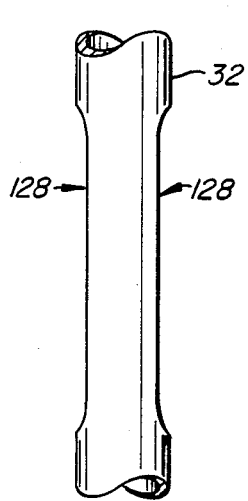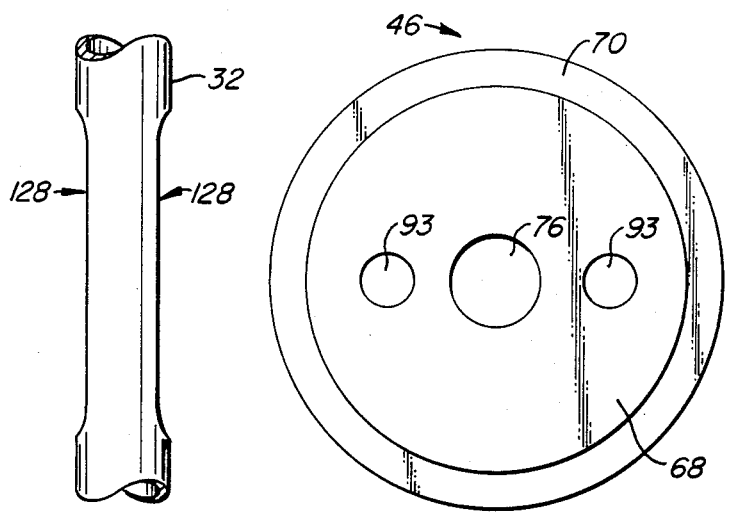
FIG._4a.
FIG._4b.
FIG._4c.
FIG._4d.
FIG._4e.

FLUID METERING APPARATUS

DESCRIPTION

1. Technical Field

The present invention is directed generally to fluid measurement and more particularly to precision metering of fluids in a closed system.

2. Background Art

As is more fully discussed in U.S. Pat. No. 3,923,203 and U.S. Pat. No. 4,162,745, both to David L. Anderson, Jr., incorporated herein by reference, there is a critical need in the area of the application of agricultural chemicals for an apparatus which permits the precise measurement of the agricultural chemical being used, which apparatus is usable in a closed system, is simple to operate and inexpensive to fabricate, and is of such design to minimize the possibility that the chemical being metered will leak or spill from the system.

In the typical closed system, the agricultural chemical is stored in concentrated form in a container. A probe, such as that disclosed in the above referenced patent to Anderson, can be used to connect to the container and to withdraw the chemical from the container. The outlet of the probe is typically connected to a mixing tank which incorporates a vacuum source for drawing the chemical from the probe into the mixing tank. The mixing tank has an outlet port from which the diluted chemical mixture can be drawn for application. Given the high toxicity of some of the agricultural chemicals now being used, it is clear that any metering device used in the mixing system should maintain the integrity of the closed nature of the system. The ability of such a metering device to do so is affected by the nature of its design and the ease with which it can be used. With respect to the latter consideration, the more complex the operation of such a device, the higher is the probability that a malfunction will occur due to component failure or operator error and that the integrity of the closed system will be impaired.

Recently, there has been a trend towards substantially increasing agricultural chemical costs as well as higher dilution ratios. Any inaccuracies in a metering system can mean a substantial dollar loss in chemicals. More importantly, inaccuracies can mean an improper dilution that can result in pest damage, excessive chemical damage, or excessive chemical residue at time of harvest. As such, there is a need for a metering device which can measure small quantities of fluid precisely.

In the past, there have been a number of efforts to provide a simple, easy to use, yet precise metering apparatus for closed system. Representative of these efforts are the devices described in the above referenced patents to Anderson and those described in U.S. Pat. No. 4,161,197 to Stevenson, British Pat. No. 21,617 to Schelewald, and Japanese Application No. 54-132353 by Saitou.

The apparatus disclosed in the patents to Anderson is capable of measuring fluids in large unit quantities, such as pints or quarts. Additionally, the procedure required to affect such measurement is time consuming and subject to error.

With respect to the metering device disclosed in the patent to Stevenson, one of the apparent problems is the requirement of three independently operable valves in order to obtain the fluid measurement, the fluid level adjustment and fluid discharge functions desirable in a metering device. Due to the independent operation of these valves, the operator is required to understand the effect the operation of a particularly valve has on the performance of the system. The operator is also required to remember a designated order of operation of the valves in order to operate the metering device correctly.

The patent application of Saitou discloses an apparatus which permits the extraction of fluids from a container and storage of the fluids into a reservoir through an input port. The apparatus can discharge the fluids in the reservoir back through the input port by regulating the application of a vacuum to the reservoir via a valve shaft. The apparatus disclosed in Saitou is not truly an in-line device and appears to require an additional valving assembly to direct fluid from the chemical holding container into the reservoir in the filling operation, or to direct fluid from the reservoir into the mixing tank during the discharge operation. As such, the apparatus disclosed therein will tend to increase the complexity of the closed mixing system.

The apparatus disclosed in British Pat. No. 21,617 is similar to that shown in Saitou except that it is more of an in-line system. One disadvantage of the structure shown is that it appears to be inoperable in a vacuum extraction system.

Other patents which are illustrative of the state of the art are U S. Pat. No. 2,451,075 to De Carli; U.S. Pat. No. 2,510,657 to Rapisarda; U.S. Pat. No. 3,247,721 to Johnson; U.S. Pat. No. 3,289,482 to Grant; U.S. Pat. No. 3,459,263 to Drivet; U.S. Pat. No. 3,634,028 to Brown; U.S. Pat. No. 3,813,945 to Crumal; U.S. Pat. No. 3,822,597 to Clark; U.S. Pat. No. 3,995,667 to Brandt; and U.S. Pat. No. 3,986,401 to Peterson.

DISCLOSURE OF INVENTION

These and other problems and disadvantages of prior closed system fluid metering apparatus, by which fluid in a measured amount can be withdrawn from a container and transferred into a mixing tank by way of vacuum from a vacuum source, are overcome by the present invention of a metering apparatus comprising fluid passageway means, coupled at one end to the vacuum source and tank and at the other end to the container, and envelope means surrounding the fluid passageway means and mounted thereon for movement between a first and second position. The envelope means provide a chamber which is hermetically sealed to the external environment. The fluid passageway means include first and second apertures which open into the chamber of the envelope means, the first aperture being located toward the vacuum-source end of the fluid passageway means and the second aperture being positioned toward the container end of the fluid passageway means. A third aperture is also provided in the fluid passageway means which opens to the chamber and which is positioned between the first and second aperture. Aperture control means are provided for blocking the fluid passageway between the second and third apertures. Finally, aperture sealing means are positioned about the fluid passageway means for movement with the envelope means, wherein the aperture sealing means close off the first and second apertures when the envelope means are in the first position. Means are also provided for automatically venting vacuum from the envelope means when the envelope means are in the first position.

In the preferred embodiment of the present invention, the fluid flow passageway is provided by a hollow tube or conduit, and the envelope means are provided by a clear cylinder which is slidably and coaxially mounted to the tube by way of annular fittings or collars at each end of the cylinder. The annular fitting at the container-end of the cylinder includes means for sealing the second aperture when the envelope means are in the first position.

In the preferred embodiment, a separate annular fitting is slidably and coaxially mounted to the tube for movement with the cylinder for sealing the first aperture when the cylinder is in its first position. Further, in the preferred embodiment of the present invention, the automatic vacuum venting means are provided by way of grooves which are colinearly positioned along the vacuum-source-end of the tube. The position of the grooves is selected relative to the first aperture so that said grooves provide a vacuum exhaust passageway between the chamber of the cylinder and the external environment when the cylinder is in the first position.

In accordance with the present invention, vacuum is applied from the vacuum source to the tube. When the cylinder is in the first position the first and second apertures are blocked and the automatic vacuum venting means provide an air flow passageway between the chamber and the external environment. As such, the contents of the chamber can be drawn into the tube through the third aperture. Because blocking means are positioned between the second and third aperture, and because the second aperture is sealed, there is no fluid flow from the container.

When the cylinder is in the second position, the automatic vacuum venting means are deactivated and the first and second apertures are opened. In this configuration, the application of vacuum to the tube causes the material in the cylinder to be drawn into the tube via apertures one and three. Where the cylinder is initially empty, the cylinder will be evacuated via apertures one and three. As this occurs, a vacuum is created in the cylinder which causes fluid to be drawn from the container through the fluid passageway and the second aperture and into the chamber of the cylinder. As the level of the fluid in the cylinder increases to a point where the third aperture is covered, the vacuum is applied to the chamber primarily through the first aperture.

When the fluid in the cylinder reaches the desired level, the user shuts off the vacuum supply, thus halting the flow of fluid into the chamber. When the user moves the cylinder into the first position, both the first and second apertures are sealed by the sealing means and the automatic vacuum venting means are opened. Thereafter, when the user reapplies vacuum to the tube, the fluid in the chamber will be drawn up into the fluid passageway, out of the cylinder, and into the mixing tank. The automatic vacuum venting means permit air from outside of the cylinder to enter the chamber and exhaust the vacuum therefrom.

Also included in the present invention are separate, manually operable vent valve means by which the user can exhaust vacuum from the cylinder regardless of position of the cylinder. The manual vent valve means are preferably positioned in communication with the fluid passageway and on the vacuum-source side of the first aperture. The manual vent valve means are useful in releasing vacuum from the cylinder to permit fluid to flow, by gravity, back into the container when the cylinder is in the second position. This becomes necessary, for example, when too much fluid has been drawn into the chamber.

In accordance with the present invention, an apparatus is provided by which precise metering of fluids can be obtained, and wherein the apparatus itself has a minimum of moving parts, is simple to use, can be easily manufactured, and maintains the integrity of closed system agricultural chemical mixing apparatus.

It is therefore an object of the present invention to provide a precision fluid metering apparatus suitable for use in a closed system.

It is another object of the present invention to provide a fluid metering apparatus which has a minimum of moving parts.

It is a further object of the present invention to provide a fluid metering apparatus which is simple to use.

It is a still further object of the present invention to provide a fluid metering apparatus which maintains the integrity of a closed agricultural chemical mixing system.

It is still another object of the present invention to provide a fluid metering apparatus comprising flow passageway means connected between a container, which holds the fluid of interest, and a mixing tank/vacuum source, wherein the flow passageway means include first, second and third apertures which open to the exterior of the fluid passageway, the third aperture being positioned between the first and second apertures and the fluid passageway being blocked between the third and second apertures, and further including envelope means which surround the flow passageway means, including the first, second and third apertures, and also including means positioned for movement with the envelope means for sealing the first and second apertures and exhausting the vacuum from the envelope when the envelope means are in a first position with respect to the flow passageway means, and for opening the first and second apertures when the envelope means are in a second position relative to the flow passageway means.

It is a further object of the present invention to provide a fluid metering apparatus comprising a hollow conduit connected in-line between a fluid container and a vacuum source, and a cylinder which is hermetically mounted on the conduit for slidable movement between a first and second position, wherein the conduit includes first, second and third apertures, the third aperture being positioned between the first and second apertures, and the fluid passageway being blocked between the second and third apertures, and further including means for blocking the first and second apertures when the cylinder is in the first position and for manually exhausting vacuum from the cylinder when the cylinder is in the second position.

These and other objectives, features and advantages of the present invention will be more readily understood upon consideration of the following detailed description of certain preferred embodiments and accompanying drawings.

BRIEF DESCRIPTION OF DRAWINGS

FIG. 1 is a simplified illustration of the present invention as it would be used in a closed agricultural chemical mixing system.

FIG. 2 is a simplified sectional view of the present invention.

FIGS. 3a–3e are simplified illustrations of the operation of the present invention.

FIGS. 4a–4e provide a simplified illustration of an alternate embodiment of the present invention.

BEST CODE FOR CARRYING OUT THE INVENTION

Referring to FIG. 1, the present invention is illustrated resident in a closed-system agricultural chemical mixing arrangement. A container 10 holds the fluid or chemical 12 of interest. A probe 16, such as that disclosed in U.S. Pat. No. 4,162,745 to Anderson is coupled to container 10 with a fluid tight cap 18. The container-end 20 of the present invention connects to probe 16. The vacuum-source-end 22 of the present invention connects to a mixing tank 24 via vacuum control valve 110. Vacuum is supplied by pump 28. Pump 28 is connected to mixing tank 24 so that it is continuously circulating fluid in the mixing tank 24. Vacuum control valve 110 is coupled to the intake end of pump 28 by way of a tee fitting 29. By operation of vacuum control valve 110 vacuum created by pump 28 can be shunted to the vacuum-source-end 22 of the present invention.

A selector valve 31 is connected at the outlet side of pump 28 to permit selectable diversion of the pumped fluid between the mixing tank 24 and a fluid mixture delivery conduit 33. Reference is made hereby to U.S. Pat. No. 3,913,606 wherein a pump/mixing tank structure is discussed in greater detail. U.S. Pat. No. 3,913,606 is hereby incorporated by reference to the extent that it describes such a pump/mixing tank structure.

Referring to FIG. 2, the structure of the present invention will now be described in greater detail. A fluid flow passageway 30 is defined by a conduit 32. Hereinafter, the vacuum-source-end of conduit 32 will be referred to as the "Downstream" end, while the container-end of conduit 32 will be referred to as the "Upstream" end.

A first set of valve ports or apertures 34 are located toward the downstream end of conduit 32 while a second set of apertures 36 are located toward the upstream end thereof. A third set of apertures 38 are located between the first and second sets of apertures, 34 and 36 respectively, and preferrably just downstream of the second set of apertures 36.

Located within the conduit 32 and between the second and third sets of apertures, 36 and 38 respectively, is a conduit plug 40 which acts to block the fluid flow passageway at that point. The plug 40 can be a built-in section of the conduit or an appropriately shaped insert. Alternately, the blockage provided can be formed by butting together the closed ends of separate conduits. Plug 40 is intended to form a permanent and air tight seal in the fluid flow passageway between the second and third sets of apertures. As such, in order for fluid from container 10 to pass through the present invention, the fluid flow path will exit conduit 32 via the second set of apertures 36 and reenter conduit 32 via either or both the first or third sets of apertures, 34 and 38 respectively.

Surrounding the portion of conduit 32, which includes the first, second and third sets of apertures, 32, 34, and 36 respectively, is an envelope 42. In the preferred embodiment of the present invention, envelope 42 comprises a calibrated, transparent vessel 44, a first conduit/vessel seal 46 and a second conduit/vessel seal 48. A chamber 50 is defined thereby. Envelope 42 is positionable between an upstream, or in-flow position, in which chamber 50 is in communication with container 10 and mixing tank 24 via flow passageway 30, and in a downstream, or discharge position, in which chamber 50 is in communication with only mixing tank 24 and the outside air. As can be seen from FIG. 2, envelope 42 is of sufficient length so that it extends along conduit 32 beyond the first set of apertures 34 and the second set of apertures 36 when it is in either the upstream or downstream position.

In the preferred embodiment of the present invention, the envelope 42 can be a sight glass cylinder constructed out of chemical resistant glass such as PYREX, manufactured by the Corning Glass Works, Corning, New York. Further, a layer of plastic tube can be overlayed the cylinder to provide temporary chemical containment in the event of cylinder fracture.

Second conduit/vessel seal 48 includes a body 52 having a cap portion 54 and a seat portion 56 which collectively define a bore 58. The seat portion 56 has a diameter which is substantially equal to the inner diameter of the vessel 44, so as to provide a tight fit between the inner wall of vessel 44 and seat portion 56. The conduit/vessel seal 48 is affixed to vessel 44 by attachment screw 49. Attachment screw 49 extends radially through the wall of vessel 44 and into the seat portion of conduit/vessel seal 48. In order to enhance the fluid and air tightness of this interface, an annular seal 60, such as an O-ring, is seated in a groove 62 which is positioned coaxially about the seat portion 56. Preferably, the downstream face 57 of seat portion 56 is beveled inwardly toward bore 58 to promote the draining of substantially all of the fluid from chamber 50 into the third set of apertures 38 when vessel 44 is in its downstream position.

The cap portion 54 has a diameter substantially equal to the outer diameter of transparent vessel 44 so that it "caps" the upstream end of vessel 44.

Bore 58 extends concentrically and axially through second conduit/vessel seal 48 and has a diameter which is slightly greater that that of conduit 32. Two annular seals 64 and 66, such as O-rings, are positioned radially along the bore 58 to form a hermetic seal between conduit 32 and conduit/vessel seal 48. Annular seals 64 and 66 are spaced axially apart from one another so that the second set of apertures can be positioned axially between them when the vessel 44 is in the downstream position. As can be seen from FIG. 2, seals 64 and 66 together form a hermetically sealed chamber in combination with conduit/vessel seal 48 and conduit 32. Thus, when vessel 44 is in the downstream position, fluid flow into or out of the second set of apertures will be prevented. Seals 64 and 66 also provide a hermetic seal between the atmosphere and the interior of vessel 44 while permitting vessel 44 to slide axially along conduit 32 between the upstream and downstream positions.

The first conduit/vessel seal 46 includes a seat portion 68, a mid-cap portion 70 and a top-cap portion 72 which define a coaxial bore 76 and a central chamber 78. Seat portion 68 has an diameter which is substantially equal to the diameter of vessel 44 so that it can be mated with vessel 44. As with the seat portion 56 of conduit/vessel seal 48, an annular seal 74 is coaxially positioned on the seat portion 68 so that a hermetic seal is formed between the vessel 44 and seat portion 68.

The mid-cap portion 70 defines the central chamber 78 and has an outer diameter which is substantially equal to the outer diameter of vessel 44.

The top-cap portion 72 has substantially the same outer diameter as the outer diameter of vessel 44 and also has a seat portion 80 which is configured to mate with the inner wall of mid-cap portion 70 to define one end of central chamber 78. Seat portion 80 includes an annular seal, such as an O-ring, to provide a hermetic seal between mid-cap portion 70 and top-cap portion 72.

Top-cap portion 72 is secured to mid-cap portion 70 by axially positioned retaining screw 82. Preferably, mid-cap portion 70 and seat portion 68 are formed from a single block of material. Vessel 44 is affixed to seat portion 68 by radially positioned retaining screw 84.

Coaxial bore 76 is collectively defined by top-cap portion 72 and seat portion 68 to have a diameter which is slightly larger than the outer diameter of conduit 32. An annular seal 86 is provided in the portion of bore 76 defined by top-cap portion 72 while a pair of annular seals 88 and 90 are provided in the portion of bore 76 defined by seat portion 68. These annular seals are selected to have a diameter such that conduit/vessel seal 46 can move slidably along conduit 32 when vessel 44 is moved between its upstream and downstream positions, and so that a hermetic seal is formed between the first conduit/vessel seal 46 and conduit 32 in the upstream position.

Annular seals 88 and 90 are spaced axially apart from one another by a distance sufficient to permit the first set of apertures 34 to be positioned between annular seals 88 and 90 when the vessel 44 is in its downstream position. Thus, when vessel 44 is in the downstream position, all flow into or out of the first set of apertures 34 is prevented.

Annular seal 88 is positioned with respect to seat portion 68 so that it will be positioned clear of the first set of apertures 34 when the vessel 44 is in its upstream position. When vessel 44 is in its upstream position, the first set of apertures 34 are positioned in the central chamber 70.

Connecting flow passageways 93 are defined in seat portion 68 which connect central chamber 78 to vessel chamber 50. Connecting flow passageways 93 provide a portion of the atmospheric air intake path which permits vacuum to be exhausted from vessel chamber 50 when the present invention is being operated in a discharge or a drain-back mode. Conversely, when the present invention is operated in a flow-through mode, connecting flow passageways 93 provide part of the fluid flow path by which fluid is permitted to flow through the first set of apertures 34 and into conduit 32.

As can be seen from FIG. 2, conduit 32 also includes a number of axially positioned grooves 95 which are located downstream of the first set of apertures 34. The grooves 95 are spaced apart from the first set of apertures so that the grooves straddle annular seal 86 when vessel 44 is in the downstream position and so that the grooves are positioned clear of annular seal 86 when vessel 44 is in the upstream position. These grooves permit atmospheric air to enter central chamber 78 and thence vessel chamber 50 when vessel 44 is in its upstream position, in other words when the present invention is being operated in the discharge mode.

A snap ring 92 is radially affixed to conduit 32 to limit the movement of vessel 44 along conduit 32. As can be seen from FIG. 2 the movement of vessel 44 into its downstream position will be halted when the snap ring 92 makes contact with the downstream end 94 of seat portion 68. Similarly, the movement of vessel 44 into its upstream position will be halted when the snap ring 92 makes contact with the upstream end 96 of top-cap portion 72. Thus, the axial dimension of chamber 78 defines the amount of displacement available to vessel 44 between its upstream and downstream positions.

Also illustrated in FIG. 2 is a manual vent valve 98 which permits the user to vent atmospheric air selectively into central chamber 78 and hence into vessel chamber 50. Manual vent valve 98 extends radially through mid-cap portion 70 and into central chamber 78 via passageway 100. Manual vent valve 98 includes a central shaft 102 which extends through passageway 100, a sealing surface 104 which is mounted radially to shaft 102 within central chamber 78, and a button portion 106 mounted to the other end of central shaft 102. A biasing spring 108 is positioned coaxially about central shaft 102 between button portion 106 and the valve body to maintain sealing surface 104 against passageway 100 until button portion 106 is depressed by the user.

Although the manual vent valve 98 is shown in FIG. 2 as being positioned in the mid-cap portion of first conduit/vessel seal 46, it is to be understood that such a valve can also be located at any point downstream of first conduit/vessel seal 46 with satisfactory results. For example such a valve can be positioned within or upstream of any vacuum control valves that are positioned between the vessel 44 and the mixing tank 24. Such an alternative is illustrated in FIG. 1 wherein a manual vent valve 109 is incorporated into a vacuum control valve 110.

Referring now to FIGS. 3a-3e, the operation of the present invention will now be described in greater detail. In connection with the following explanation, it is to be understood that the application of vacuum to conduit 32 is controlled by a vacuum control valve, such as valve 110 in FIG. 1, which is positioned in line, between vessel 44 and pump 28. Also, it is to be understood that the container-end of conduit 32 is coupled to a container, such as container 10 in FIG. 1, which holds the fluid to be measured.

FIG. 3a illustrates the present invention when vessel 44 is in the downstream position and the vacuum control valve 110 has cut off vacuum to conduit 32, as indicated by an "X" at the top of conduit 32. Snap ring 92 is seen positioned against upstream surface 94 of seat portion 68 to limit further travel by vessel 44 in the downstream direction. It can be seen that the first set and second sets of apertures, 34 and 36 respectively, are sealed off by their respective O-ring seal pairs, 88/90 and 64/66. Additionally, grooves 95 straddle O-ring seal 86. In this configuration, no fluid can be drawn from chamber 50 into the mixing tank 24, nor can any fluid be drawn into chamber 50 from container 10. The above is termed the "static" mode of the present invention.

In FIG. 3b, vessel 44 is shown in its upstream position. Note that the first set of apertures 34 have now been positioned clear of O-ring seal pair 88/90, and is now located within central chamber 78. Grooves 95 have been positioned away from O-ring seal 86. Snap ring 92 can be seen positioned against downstream surface 96 of top-cap portion 72 to limit further travel of vessel 44 in the upstream direction. Vacuum control valve 110 is indicated to be open, see arrow 112. In this mode, assuming that chamber 50 was initially empty, air is drawn from chamber 50 through the first and third sets of apertures, 34 and 38 respectively. As the pressure in chamber 50 drops, fluid from container 10 is drawn into conduit 32 and thence into chamber 50 via the second set of apertures 36. This is illustrated by arrow 114. When the fluid has reached the desired level in chamber 50, the user closes vacuum control valve 110 to shut off the vacuum to conduit 32. At this point, the level of the fluid in chamber 50 will remain unchanged because no exhaust paths are provided to relieve the vacuum within chamber 50. This mode is referred to as the "fill-measure" mode.

FIG. 3c illustrates the "drain-back" mode of the present invention. In this mode, the vacuum control valve 110 has been shut off and the vessel 44 is in its upstream position. The user depresses push button 106 of manual vent valve 98 to permit atmospheric air, see arrow 116, to enter central chamber 78 and to flow though connecting flow passageways 93 into chamber 50. This relieves the vacuum in chamber 50 and permits fluid to flow back into container 10 via the second set of apertures 36 and conduit 32. This mode is useful where the fluid level in chamber 50 has exceeded the desired level.

FIG. 3d illustrates the "flow-through" mode which is employed when the user desires to permit fluid to flow continuously through vessel 44 and into mixing tank 24. Here, vessel 44 is in its upstream position. Manual vent valve 98 is maintained in a closed condition and vacuum control valve 110 is open. In this configuration, fluid will fill chamber 50 and be drawn up through connecting flow passages 93 into central chamber 78, see arrows 118. Upon entering central chamber 78, the fluid will be drawn into conduit 32 via the first set of apertures 34.

FIG. 3e illustrates the "measure-out" mode wherein fluid which has been previously measure in vessel 44 is discharged through conduit 32 and into mixing tank 24. In this mode, the vessel 44 is in its downstream position so that the first and second sets of apertures are sealed off. Vacuum control valve 110 is open so as to apply vacuum to conduit 32 and to chamber 50, via the third set of apertures 38. Grooves 95 are positioned to straddle O-ring seal 86 to permit atmospheric air, see arrows 116, to enter chamber 50. The fluid in chamber 50 is thus permitted to flow into the third set of apertures 38 and into conduit 32 and mixing tank 24, see arrows 114.

As described above, the present invention provides an effective and precise metering apparatus which is simple to operate and manufacture. It should be apparent that the present invention requires only a minimum of moving parts to implement, thus reducing the complexity of operation and the possibility of catastrophic part failure. In the preferred embodiment of the present invention, the conduit/vessel seals 46 and 48 can be constructed from Delrin, a plastic material manufactured by E. J. Dupont DeNemours and Co. of Wilmington, Delaware. The seals, such as the O-ring seals, can be constructed of an elastomer, such as Viton, for example O-Ring Compound No. V747-75, manufactured by Parker Seal Group of Lexington, Kentucky.

Referring to FIG. 4a through 4e, a further embodiment of the present invention will now be discussed. When loading fluid quantities in the full-cylinder or more range, it is desirable to have the ability to automatically halt the filling of vessel 44 when chamber 50 is completely full, and before fluid begins to flow through connecting flow passageways 93. In accordance with the further embodiment of the present invention illustrated in FIGS. 4a through 4e, a float stopper assembly 120 is utilized to seal off connecting passageways 93 when the fluid being measured completely fills chamber 50. In the preferred embodiment of the present invention, the float stopper assembly 120 is constructed of low density material and floats upon the surface of the fluid to be measured. FIG. 4a illustrates one embodiment of such a float. In this embodiment, two plug portions 122 are supported and spaced apart by member 124. A top view of stopper assembly 120 is shown in FIG. 4b. Member 124 includes an aperture 126 which is shaped to permit member 124 to be mounted on conduit 32 and to slide along conduit 32 in relation to the level of the fluid in chamber 50.

In this further embodiment to the present invention, conduit 32 is machined in an axial dimension to have parallel surfaces in the vicinity of the first set of apertures 34. The aperture 126 in member 124 is shaped to have two parallel edges which are shaped to travel along the axial, parallel surfaces of conduit 32 so as to prevent member 124 from rotating about conduit 32. These axial, parallel surfaces 128 can be seen in FIG. 4a and FIG. 4c. Preferably, surfaces 128 extend axially along conduit 32 to a point which is spaced from the first set of apertures 34. This spacing is selected so that when vessel 44 is in its downstream position, the parallel surfaces 128 will be positioned just short of O-ring seal 90. The length of parallel surfaces 128 is selected so that stopper assembly 120 can move in an axial direction over a short distance, thereby maintaining the slidability of stopper assembly 120 along conduit 32.

Also shown in FIG. 4a is a modified cap portion 68 of conduit/vessel seal 46. In the first described embodiment of the present invention, the upstream surfaces of seat portion 68 were beveled, and the connecting flow passageways 93 were angled slightly from being parallel with conduit 32. In the alternative embodiment of the present invention, connecting flow passageways 93 are positioned to be parallel to conduit 32, and the upstream face of seat portion 68 is now planar in nature.

As can further be seen from FIG. 4a, the spacing of plug portions 122 is selected to correspond to the spacing of connecting flow passages 93 as they emerge from the upstream face of seat portion 68.

The plug portions 122 are preferably constructed of flexible, low-density, chemically resistant material. The surfaces of plug portions 122 which contact the openings of connecting flow passageways 93 are shaped to seal the openings to further fluid flow. As can be seen from FIG. 4a, one such shape is a dome-like structure.

FIG. 4d is a view of the upstream face of conduit/vessel seal 46, and illustrates the orientation of the openings for connecting flow passageways 93, and bore 76.

As discussed above, the parallel surfaces 128 on conduit 32 are used to prevent stopper assembly 120 from rotating about conduit 32. Conduit 32, in turn, is maintained in an aligned position, so that plug portions 122 will mate with the openings of connecting flow passageways 93, by a key-type arrangement located in the conduit/vessel seal 48 at the upstream end of vessel 44. This is illustrated in FIG. 4e. There, it can be seen that a conduit 32 has a lateral extension 130, and that the top cap portion 54 of conduit/vessel seal 48 has been elongated axially to form an extension 132. Positioned in the extension 132 is an axial groove 134 which is shaped to accept lateral extension 130. In operation, lateral extension 130 travels axially along groove 134 as the vessel 44 is moved between its upstream and downstream positions. This groove/lateral-extension combination prevents conduit 32 from rotating.

In order to provide the user with a flow-through mode option, a radial groove 136 is formed having one end which joins with axial groove 134, and which extends over an arc of approximately 45 degrees. This permits vessel 44 to be positioned in its upstream position and rotated over a 45 degree arc to misalign float stopper assembly 120 with respect to connecting flow passageways 93. In this position, stopper assembly 120 will still slide along conduit 132, but will not be able to seal connecting flow passageways 93 when chamber 50 is entirely filled with fluid. The fluid will thus be permitted to flow through connecting flow passageways 93 into central chamber 78, and through the first set of apertures 34 of conduit 32.

It is to be understood that there are a number of ways in which the vessel 44 and the conduit/vessel seals 46 and 48 can be implemented. For example, they can be molded as a single structure, with the appropriate material being used to provide a see through vessel portion.

The terms and expressions which have been employed here are used as terms of description and not of limitations, and there is no intention, in the use of such terms and expressions of excluding equivalents of the features shown and described, or portions thereof, it being recognized that various modifications are possible within the scope of the invention claimed.

I claim:

1. An apparatus for use with a vacuum source for metering fluids stored in a reservoir comprising:
   means having a first end adapted for coupling to the vacuum source and a second end adapted for coupling to the reservoir for providing a fluid passageway between said vacuum source and said reservoir, said means having
   (a) a first aperture positioned toward the first end;
   (b) a second aperture positioned toward the second end; and
   (c) a third aperture positioned between the first and second apertures;
   means for blocking the fluid passageway means between the second and third apertures;
   envelope means surrounding the fluid passageway means for containing fluids wherein said envelope means define a chamber into which the first, second and third apertures open, and mounted to the fluid passageway means for movement between a first position and a second position;
   aperture control means coupled for movement with the envelope means for preventing fluid flow through the first and second apertures when the envelope means are in the first position, and for permitting fluid flow through the first and second apertures when the envelope means are in the second position; and
   means for venting vacuum from the envelope means when the envelope means are in the second position.

2. The apparatus as recited in claim 1 wherein the flow passageway means are a tube and the first, second and third apertures are ports which open radially to the interior of the tube and, further wherein the second and third apertures are positioned adjacent to and to either side of the blocking means.

3. The apparatus as recited in claim 2 wherein the envelope means are a transparent graduated cylinder and the aperture control means comprise
   a first annular fitting shaped to seal one end of the graduated cylinder; and
   a second annular fitting shaped to seal the other end of the graduated cylinder, wherein the first and second annular fittings each have an axial bore which is shaped to receive and to permit the annular fitting to slide along the fluid passageway means; and
   further including means positioned in each bore and shaped for sealing apertures of the fluid passageway means which are positioned within said axial bore, and further wherein the spacing between the first and second apertures is selected so that the first aperture is positioned within the axial bore of the first annular fitting and the second aperture is positioned within the axial bore of the second annular fitting when the envelope means are in the first position.

4. The apparatus as recited in claim 1 wherein the blocking means comprise an air tight barrier which is positioned within the fluid passageway.

5. The apparatus of claim 2 wherein the aperture control means comprise a first and a second collar slideably mounted on the tube and in coaxial relationship therewith, wherein the first collar is coupled for movement with the envelope means and positioned to seal the first aperture when the envelope means is in the first position, and further wherein the second collar is coupled for movement with the envelope means and positioned to seal the second aperture when the envelope means are in the first position.

6. The apparatus of claim 3 further including means positioned in the bore of the first and second annular fittings for providing an air tight seal between the cylinder and the flow passageway means, and further wherein the vacuum venting means include a plurality of grooves extending axially along the flow passageway means so that said plurality of grooves straddle the air tight seal means when the graduated cylinder is in the first position.

7. The apparatus of claim 1 wherein fluid from the reservoir flows into the chamber when the envelope means is in the second position and further including float means for sealing the venting means and the first aperture from interaction with the chamber when the chamber becomes substantially filled with liquid.

8. The apparatus of claim 7 wherein the envelope means comprise a cylinder which is open at opposite ends and further wherein the aperture control means include
   a first annular fitting which seals one end of the cylinder and which defines an intermediate chamber between an end portion and an aperture seal portion, wherein the intermediate chamber is coupled to the chamber of the envelope means by connecting flow passageways, and wherein the aperture seal portion seals the first aperture when the envelope means are in the first position, and further wherein the vacuum venting means communicate with the intermediate chamber to vent vacuum from the chamber of the envelope means; and
   a second annular fitting which seals the other end of the cylinder and which has an aperture sealing portion for sealing the second aperture when the flow passageway means are in the first position;
   wherein the first and second annular fittings include axial bores through which the flow passageway means pass and which support the cylinder for movement relative to the flow passageway means, and further wherein the first aperture is positioned in the intermediate chamber when the flow passageway means are in the second position.

9. The apparatus of claim 8 wherein the float means comprise means positioned in the chamber of the envelope means for movement with the level of fluid in the envelope means, the float means including plug means aligned for engagement with the connecting flow passageways to seal said passageways when the chamber of the envelope means is substantially full.

10. The apparatus of claim 1 further including means positioned between the first aperture and the vacuum source for manually controlling the application of vacuum to or the exhausting of vacuum from the envelope means so that fluid can drain back into the container by gravity when said means are operated to exhaust vacuum from the envelope means.

11. The apparatus of claim 10 wherein said manual vacuum control means include control valve means for controlling the communication between the vacuum source and the flow passageway means; and manual vent valve means, positioned between the control valve means and the flow passageway means and operable by the user, for temporarily opening the flow passageway means to the atmosphere.

12. The apparatus of claim 8 wherein the cylinder is transparent and constructed of chemical resistant material.

13. The apparatus of claim 8 wherein the end portion of the first annular fitting includes means for hermetically coupling the end portion to the flow passageway means, and further wherein the vacuum venting means comprise a number of grooves positioned axially on the surface of the flow passageway means which are positioned to straddle the hermetic coupling means in the first annular fitting when the envelope means are in the first position so that the hermetic seal between the end portion of the first annular fitting and the flow passageway means is temporarily bypassed.

14. An apparatus for metering fluids in a closed system of the type wherein fluids are withdrawn from a holding container in measured quantity and transferred to a mixing tank by vacuum induced flow, the apparatus comprising a conduit defining a flow passageway and having first, second and third ports which open from the flow passageway to the exterior of the conduit, the third port being positioned between the first and second ports and substantially adjacent the second port, the conduit further including axially extending surface grooves positioned adjacent the first port so that the first port is positioned between the axially extending grooves and the third port;

a transparent cylinder positioned coaxially with respect to the conduit and surrounding the conduit over a predetermined longitudinal distance to define a fluid chamber, the transparent cylinder being slidable between a first and second position;

a first annular seal positioned at one end of the transparent cylinder and having an axial bore shaped to permit the conduit to slide therethrough while hermetically sealing the conduit and the transparent cylinder; and a second annular seal positioned at the opposite end of the transparent cylinder and having an axial bore shaped to permit the conduit to slide therethough while hermetically sealing the conduit and the transparent cylinder, wherein the axial bore of the first and second annular seals include means for sealing the first port and second port respectively when the transparent cylinder is in its first position; so that in the second position of the cylinder, fluid is drawn into the cylinder from the container and through the second port, and so that in the first position of the cylinder fluid flow from the container is cut off and fluid in the cylinder is discharged into the mixing tank.

* * * * *